Patented Sept. 21, 1926.

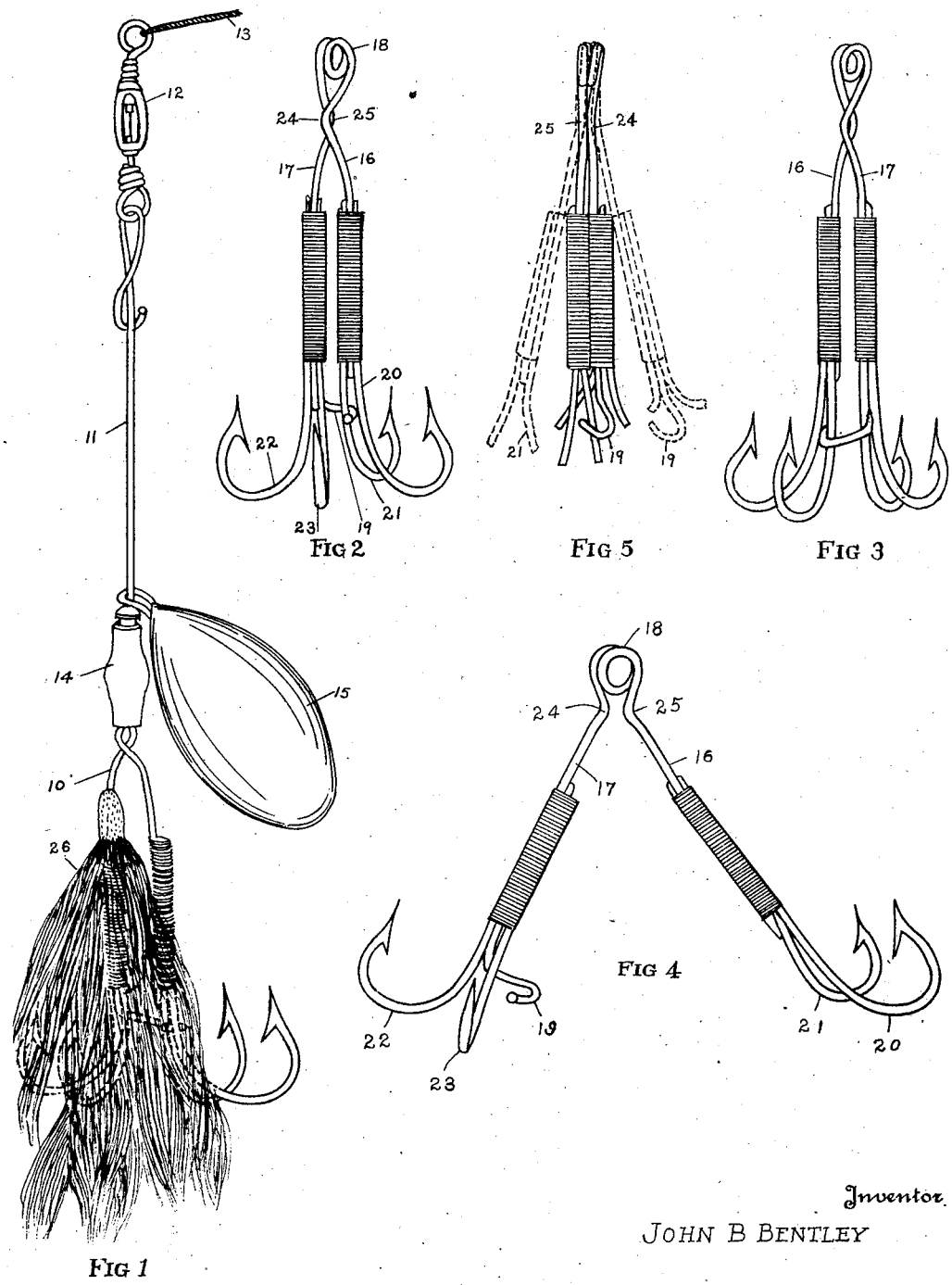

1,600,618

UNITED STATES PATENT OFFICE.

JOHN B. BENTLEY, OF JAMESTOWN, NEW YORK.

FISH LURE.

Application filed May 13, 1925. Serial No. 30,017.

This invention relates to an improvement in a fish lure, and particularly in a lure including a plurality of hooks, which become separated after entering the fish's mouth.

Hooks of this general type are not broadly new, but those formerly made are open to the objection that while the hook will spring open after it has been seized by the fish, it can be closed again, and the fish can free himself from it.

The primary object of this invention is to provide a fish lure in which is included a hook proper, having a plurality of hooks, and means for normally holding the hooks in close juxtaposition.

A further object of this invention is to provide in a fish lure of that type, means which will prevent securing the hooks in juxtaposition without a certain amount of relative lateral shifting.

Other objects of this invention will appear from a consideration of the following description taken in connection with the drawings which form a part thereof, and in which—

Fig. 1 is a view of a fish lure embodying this invention;

Figs. 2 and 3 are views in elevation of the hook proper of the lure in the closed position;

Fig. 4 is a similar view of the hook proper in the expanded position; and

Fig. 5 is a side elevation of the hook proper showing in full lines the position of the parts when the hook is closed, and in dotted lines the position of the parts when the hook is open.

Referring to the drawings, the reference numeral 10 is employed to designate a fish lure comprising a hook proper embodying one form of this invention mounted upon a wire 11 and connected through a swivel 12 with a line 13. Covering the union of the hook proper with the wire 11 is a rubber tube 14 and carried by the wire is a spoon 15. The hook proper is of the spring type consisting of shanks 16 and 17 connected at the top by an integral spring coil 18. The shank 17 terminates in a catch 19, the purpose of which will be disclosed later, and the spring coil 18 tends to separate the shanks, as shown in Figure 5.

Sweated onto the shanks 16 and 17 are hooks 20, 21, 22 and 23. While the hooks 20, 21, 22 and 23, here shown are of the barbed type, hooks of the barbless type could obviously be employed, if desired. The catch 19 on the shank 17 engages the hook 21, as shown in Figures 2 and 3, and prevents the shanks from separating under the urge of the spring coil 18.

The shanks 16 and 17 are provided with offsets 24, 25, which bear laterally against each other, as indicated in Figure 5 when the hook is closed. When the hook is open, however, the shanks 16, 17, separate laterally from each other, so that merely compressing the hooks at the outer ends of the shanks would not bring the catch 19 in such position that it would engage the hook 21. In other words, in order to close the hook, the shanks are first brought together against the action of the spring coil 18, and are then shifted laterally, pivoting on the line of contact of the offsets 24 and 25.

The shank 17 is provided with feathers 26 for the purpose of attracting fish. The lure, as shown, is adapted for use either in trolling or in casting, and as every fisherman knows, when in the water it turns over and over by reason of the swivel 12. The fish attracted by the flashing of the spoon 15 strikes at it, and in doing so swallows the hook, thus compressing the shanks 16 and 17 to free the hook 21 from the catch 19, so that the spring coil 18 and the offsets 24 and 25 act to open the shanks, and imbed the hooks, 20, 21, 22 and 23 in the fish's mouth. The four hooks are now in the mouth of the fish, and it is absolutely unable to throw the hook out, because even though the fish could compress the shanks 16 and 17 against the urge of the spring coil 18, it could not give them the lateral motion required by the offsets 24 and 25 before the catch 19 could engage the hook 21.

While one embodiment of this invention has been shown and described, applicant is not limited thereto, since it is obvious that other embodiments can be made without departing from the spirit and scope of this invention, as set forth in the following claims.

Having thus set forth my invention, what I claim as new and for which I desire protection by Letters Patent is:

1. In a fish lure, a hook comprising two shanks connected by an integral spring coil which tends to separate the ends of said shanks, hooks secured to each of said shanks, one of said shanks being extended to form a catch which will engage one of the hooks on the other shank and hold the hooks in close juxtaposition against the normal tendency of said spring coil, an offset on each shank, said offsets contacting with each other and necessitating the lateral movement of said hooks in order to bring said catch and its hook into engaging position.

2. In a fish lure a hook comprising two shanks connected by an integral spring coil, an offset on each shank just below said coil, bent at such an angle that they will meet and prevent tightening the coil to bring the ends of the shanks in close proximity, thus necessitating shifting one of said shanks laterally so that the offsets can pass one another and the ends of the shanks brought into close proximity and a catch for holding the ends in that position, thus placing the shanks under continual tension.

In testimony whereof I have affixed my signature.

JOHN B. BENTLEY.